Sept. 29, 1936.   H. WILSDORF   2,055,568
TESTING APPARATUS FOR FLUID TIGHT CASINGS
Filed Nov. 1, 1935
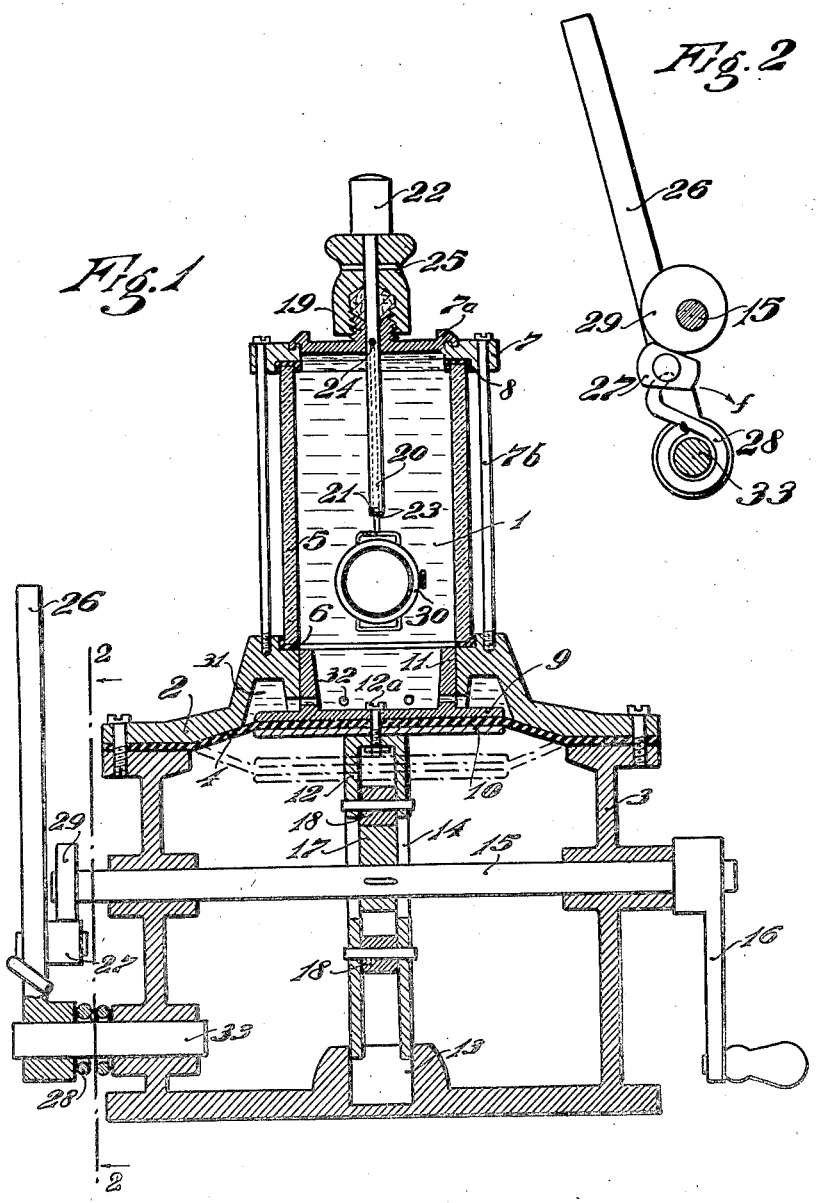

Patented Sept. 29, 1936

2,055,568

UNITED STATES PATENT OFFICE 2,055,568

TESTING APPARATUS FOR FLUID TIGHT CASINGS

Hans Wilsdorf, Geneva, Switzerland

Application November 1, 1935, Serial No. 47,898
In Switzerland November 10, 1934

3 Claims. (Cl. 73—51)

This invention relates to testing apparatus for fluid-tight casings and more particularly to apparatus for testing the tightness of watch cases. It is an object of the invention to provide an apparatus of this type which enables quick and efficient examination of fluid-tight casings by direct observation of the casing during the act of testing.

The invention consists in an apparatus comprising a transparent receptacle containing a liquid into which the casing to be tested will be suspended, the receptacle being arranged to be hermetically closed, while means are provided to create a vacuum in the receptacle above the liquid level, so that when the tested casing would not be fluidtight, air bubbles would escape therefrom to the surface of the liquid and such bubbles can be observed as the casing to be tested is suspended in a transparent receptacle of glass or similar material.

The accompanying drawing illustrates a practical embodiment of the invention.

Figure 1 is a vertical, axial section through the apparatus.

Figure 2 is a section along the line 2—2 of Fig. 1.

The represented apparatus comprises a receptacle 1 which is formed by a metal base 2 mounted on a frame 3, by a bottom including a flexible diaphragm 4 secured between the base 2 and the frame 3, by a glass cylinder 5 placed on the base 2, by a ring 7 placed on top of the glass cylinder 5, gaskets 6 and 8 being inserted between the cylinder and the members 2 and 7, respectively, and by a cover 7a being freely placed on the ring 7 which is secured to the base 2 by means of screws 7b.

The diaphragm 4 passes between two metal disks 9 and 10; the disk 9 carries an annular rim 11 guided in the base 2, while a connecting rod 12 guided in a recess 13 of the frame 3 is secured to the two disks 9 and 10 by means of a screw 12a. The rod 12 is provided with slots 14 through which passes freely a shaft 15 rotatably mounted in the frame 3 and carrying an operating handle 16. To the shaft 15 is keyed an eccentric disk 17 which coacts with two rollers 18 mounted on the rod 12 above and below, respectively, the shaft 15.

The cover 7a carries a stuffing-box 19 which is traversed by a tube 20 provided, at its lower end with a hook 21 on which the casing to be tested is suspended. The upper end of the tube 20 carries an operating handle 22 and the lower half of the tube is pierced to form a passage 23 leading from a hole 24 in the tube to its bottom end.

When the apparatus is employed, the case 30 to be tested is suspended on the hook 21, the cover 7a being removed for this purpose. The receptacle 1 is filled with water, and the cover 7a with the tube 20 and the case 30 is put in place on the ring 7. The water also fills the space 31 between the base 2 and the diaphragm 4, owing to holes 32 provided in the rim 11. The diaphragm then occupies its upper position shown in full lines in Fig. 1. The shaft 15 is now rotated by means of the handle 16, and the eccentric 17, acting on the lower roller 18, pushes the rod 12 and the diaphragm 4 downwards until this latter occupies the position shown in dot and dash lines. The water also descends in the receptacle 1 as the capacity of this latter has been increased, and above the water level there is created a vacuum. When the case 30 is not completely fluid-tight, the air contained in the case will escape in small bubbles which will mount to the surface of the water. Owing to the glass cylinder 5 such bubbles can be observed and the place of leakage detected.

Once the shaft 15 has been turned to bring the diaphragm 4 to its lower position, care must be taken not to turn the shaft backwards by inadvertence, since bringing the diaphragm back to its first position could cause an overpressure of the water in the receptacle and if the casing would not be tight, water could penetrate into its interior and deteriorate its contents. To prevent such backwards rotation, a safety device has been provided which comprises a lever 26 rotatably mounted on a pin 33 carried by the frame and subjected to the action of a spring 28 tending to turn the lever in the direction of the arrow f. The lever carries a bolt member 27 and the shaft 15 carries an eccentric 29 against which the spring 28 applies the bolt 27. The safety device thus permits rotation of the shaft 15 through half a turn in one direction, but backwards rotation of the eccentric and the shaft is prevented by the bolt 27. In order to bring the diaphragm 4 back to its upper position once it has been lowered, the lever 26 must be retracted by hand against the action of the spring 28 in order to remove the bolt 27 from engagement with the eccentric 29.

When a testing operation is finished, the tube 20 is pulled upwardly so that the hole or holes 24 in the tube communicate with holes 25 in the stuffing box 19, and air can enter through the passage 23 into the interior of the receptacle; the cover 7a and the casing 30 can then be removed.

I claim:—

1. Apparatus for testing fluid-tight casings, comprising a fluid-tight partly transparent receptacle adapted to be filled with liquid, means for suspending the casing to be tested in the liquid within the receptacle, said receptacle having a bottom formed by a flexible diaphragm, a frame carrying said receptacle, a shaft mounted in the frame, an eccentric disk carried by the shaft, means operatively connecting said disk to the diaphragm whereby a movement of rotation of the shaft in one direction causes a downward movement of the diaphragm and an increase in volume of the receptacle to create a vacuum above the liquid level, and means coacting with said shaft when the diaphragm has been downwardly moved, for locking the shaft against rotation and preventing return movement of the diaphragm.

2. Apparatus for testing fluid-tight casings, comprising a fluid-tight partly transparent receptacle adapted to be filled with liquid, means for suspending the casing to be tested in the liquid within the receptacle, said receptacle having a bottom formed by a flexible diaphragm, a frame carrying said receptacle, a shaft mounted in the frame, an eccentric disk carried by the shaft, and means operatively connecting said disk to the diaphragm whereby a movement of rotation of the shaft in one direction causes a downward movement of the diaphragm and an increase in volume of the receptacle to create a vacuum above the liquid level, a locking lever rotatably mounted on said frame, a second eccentric disk on said shaft, and spring means urging said locking lever into engagement with said second eccentric disk to prevent return movement of the shaft after creation of the vacuum in the receptacle.

3. Apparatus for testing fluid-tight casings, comprising a fluid-tight receptacle adapted to contain a liquid, means for temporarily increasing the volume of the receptacle to create a vacuum therein above the liquid level, a shiftable tube penetrating through the wall of the receptacle, means on said tube for suspending the casing to be tested into the liquid within the receptacle, said tube having its outer end closed and its inner end opening into the receptacle and being provided with a hole intermediate its length whereby when said tube is shifted outwardly relative to the receptacle communication is established between the interior of the receptacle and the atmosphere and when shifted inwardly such communication is prevented.

HANS WILSDORF.